3,019,205
STABILIZED ASBESTOS FILLED POLYVINYL CHLORIDE RESINS
Robert A. Buckley, Bedford, and Baruch Zaremsky, South Euclid, Ohio, assignors to Ferro Corporation, Cleveland, Ohio
No Drawing. Filed May 27, 1959, Ser. No. 816,041
4 Claims. (Cl. 260—23)

This invention relates as indicated to asbestos-filled polyvinyl chloride compositions which are resistant to the degrading effects of heat and light.

Asbestos filler is commonly used in many compositions containing polyvinyl chloride. A typical example is asbestos-filled vinyl floor tile. While the asbestos introduces some desirable physical properties in polyvinyl chloride-containing formulations, e.g., tile formulations, it also introduces impurities which accelerate the degradation of the vinyl polymers during normal hot mixing and forming of the products. Typical impurities which so accelerate degradation include iron-containing compounds. The degradation of the polymer appears as a discoloration of the product.

When stabilized against heat degradation, these compositions are found to be particularly sensitive to discoloration by ultraviolet light (as in sunlight) after the finished product is formed.

It has now been found that boric acid in amounts ranging from about 0.5 to 20 parts by weight of boric acid per one hundred parts by weight of resin, and with or without some suitable polyhydric alcohol, such as, pentaerythritol, reduces or inhibits the adverse catalytic effect of iron and related metal compounds. While we do not wish to be bound by any theory of how the boric acid effects the stabilization, it is believed that the inhibition of the catalytic degradation of vinyl chloride resin by iron and related metal compound impurities is accomplished by chelation of such impurities by the boric acid.

It has also been found that by the addition of certain zinc compounds, the ultraviolet light stability of the boric acid stabilized systems is markedly increased, so that formulations having otherwise inadequate light stability for commercial application are now rendered fully acceptable. It has been found further that this light stabilizing action of zinc compounds, which is generally slight or non-existent when conventional heat stabilizers are used in vinyl-asbestos formulations is unexpectedly marked when boric acid is used as the principal heat stabilizer.

It has also been found that in some cases, further improvement in light stability of such systems stabilized by boric acid and zinc compounds may be obtained by the use of certain phenolic antioxidants.

It is an object of the present invention, therefore, to provide heat resistant compositions containing polyvinyl chloride with which has been admixed asbestos containing iron or related metal impurities.

Other objects of the invention will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

Briefly stated, this invention comprises as a new composition of matter, asbestos filled polyvinyl chloride resins containing from about 0.5 to about 20 parts by weight of boric acid per 100 parts of resin. In certain other embodiments of the invention, the polyvinyl chloride resins containing boric acid as aforesaid may also have added thereto from about 0.01 to about 0.5 parts by weight of zinc per hundred parts of resin in the form of zinc chloride, or a zinc salt of a carboxylic acid, with the optional inclusion of an antioxidant, to obtain increased light stability.

Within the scope of this invention, the term "polyvinyl chloride," where not otherwise limited or defined, is intended to include polymers containing at least 50% vinyl chloride by weight of the monomeric units. Thus, polyvinyl chloride homopolymers, and commercial vinyl chloride-acetate, or vinyl chloride-acetate-alcohol, or vinyl chloride-vinylidene chloride copolymers are included. This invention includes compositions in which other related or unrelated polymers are added, as long as the vinyl chloride containing resin is present as a major ingredient, and at least 50% of the monomeric content of that resin is vinyl chloride.

The principal stabilizer of the compositions of the present invention, then, is boric acid, a well known and readily available inorganic chemical compound. This material is incorporated into conventional asbestos-containing polyvinyl chloride resins by conventional methods of introduction of such ingredients in powdered form into polymers of the types herein contemplated. For example, the boric acid may be introduced into polyvinyl chloride by milling procedures well known in the art, such as on a 2-roll mill and carrying out the milling operation for ten minutes at a temperature of 220° F. A filler, such as asbestos may be milled into the composition simultaneously. Typically conventional plasticizers, e.g., di-2-ethyl hexyl phthalate, or epoxidized soya bean oil; additional fillers, e.g., calcium carbonate; and pigments, e.g., titanium dioxide, or organic or inorganic colorants; are also employed in these compositions. The resultant composition does not undergo the discoloration normally experienced with vinyl chloride containing resins, e.g., vinyl chloride-vinyl acetate copolymers containing 13% vinyl acetate. A composition composed of 100 parts by weight of polyvinyl chloride-acetate (13% vinyl acetate) and 100 parts of asbestos heated in an oven at 325° F. discolors in 15 minutes. The inclusion of 3 parts by weight of boric acid in this same formulation yields a product which remains undiscolored after 60 minutes in an oven at 325° F. and is only slightly discolored after 120 minutes. Such a stabilized product is useful in the production of vinyl tile which will not be subjected to prolonged exposure to ultraviolet light sources, i.e., for interior use.

It has further been found that vinyl chloride-containing compositions which are stabilized against heat degradation by the inclusion of boric acid are of generally poor light stability. Hence, where products made from vinyl chloride containing resins having an asbestos filler included therein and stabilized against degradation at elevated temperatures by the inclusion of boric acid are to be used where exposure to ultraviolet light or sunlight occurs, it has been found that the light stability may be greatly improved by the addition of small amounts of zinc compounds, for example, zinc oxide, zinc chloride, or any of the zinc salts of carboxylic acids. The nature of the organic radical associated with the zinc is apparently of little or no importance in light stabilization so long as it is not deleteriously reactive with the system. Thus, zinc acetate, zinc butyrate, zinc hexoate, zinc-2-ethyl hexoate, zinc caprylate, zinc n-octoate, zinc ricinoleate, zinc stearate, zinc oleate, zinc naphthenate, zinc benzoate, zinc salicylate, zinc hydroxy stearate, zinc phthalate, zinc adipate, etc. may all be used. The organic salts of zinc are preferred materials since they are somewhat easier to disperse. Further choice may be made among these zinc compounds on the basis of certain physical properties such as melting point and solvent leachability.

The effect of the zinc as a light stabilizer is often further intensified by the inclusion in the composition of an antioxidant of the phenolic type which is compatible with the vinyl chloride-containing resin. Thus, such well known phenolic antioxidant materials as di-tert.-butyl-p-cresol, di-tert.-butyl phenol, tert.-butyl phenol, p-tert.-amyl phenol, p-diisobutyl, p-nonyl phenol, p-dodecyl phenol, dimethyl di-(p-hydroxy phenyl) methane (Bisphenol A), and the like may be employed. Again, it does not appear critical as to the nature of the organic residue in the phenylol groups in a compound which is compatible and of generally non-exuding nature in polyvinyl chloride-containing resins.

The stabilizing agents and the additional ingredients may be incorporated into these resins by any of a number of methods well known in the art. The materials may be added to the solid resins and mixed therein by means of hot roll or other mixing machines adapted to mix solid resins. The materials to be added may also be dissolved in a suitable solvent and then mixed with a solution of the resin. The only important prerequisite is that the stabilizers and the resin be thoroughly mixed and dispersion complete as possible. As indicated above, these compositions when filled with asbestos to the extent of from about 20 to 200 parts by weight per 100 parts of resin, are useful in the fabrication of numerous articles, and particularly the fabrication of vinyl tile according to a common formulation comprising equal parts of asbestos and vinyl chloride polymer.

A basic vinyl chloride resin composition suitable for use in the fabrication of vinyl tile has the following formulation:

EXAMPLE 1

| | Parts |
|---|---|
| Vinyl chloride-vinyl acetate copolymer (13% vinyl acetate) | 100 |
| Di-(2-ethylhexyl) phthalate | 40 |
| Epoxidized soya bean oil | 10 |
| Asbestos fiber (Canadian; Johns-Manville Grade 7R) | 100 |
| Calcium carbonate | 200 |
| Titanium dioxide | 5 |
| Stearic acid | 2 |

These ingredients were milled on a 2-roll mill for ten minutes at 220° F. The resultant milled sheet was heat tested in an oven at 325° F. This composition discolored to a brown color in 15 minutes.

EXAMPLE 2

The same basic formulation as given in Example 1 above was formulated including additionally 3 parts by weight of boric acid incorporated in the same manner and along with the other ingredients as given in Example 1. The milled sheets of this Example remained undiscolored after 60 minutes heating in the oven at 325° F. and was only slightly discolored after 120 minutes.

EXAMPLE 3

The same composition as formulated in Example 2 above was reformulated utilizing instead 4 parts by weight of boric acid. This product produced slightly better heat stability than was observed in Example 2.

The addition of boric acid to asbestos filled tile formulations is generally associated with poor light stability. It is often impossible, (depending on the grade of asbestos used) to obtain milled undiscolored samples for light tests, when no heat stabilizer is used. It was found, however, that when such undiscolored specimens were obtainable, exposure to ultra-violet light in the standard test, induced failure at not more than 72 hours. When boric acid is used alone as a stabilizer, the resulting product is not acceptable where resistance to discoloration by sunlight or ultraviolet light is required commercially. Where such light stability is not required, boric acid is a highly effective stabilizer. In standard Fade-o-meter tests, the composition of Example 1 above to which 2 to 6 parts of boric acid have been added, fail at 48 hours exposure to ultraviolet light.

EXAMPLE 4

A formulation was made similar to that of Example 1 above except that the asbestos and calcium carbonate are present at only one-half the indicated concentration. The composition had the formulation as follows:

| | Parts |
|---|---|
| Vinyl chloride-vinyl acetate copolymer (13% vinyl acetate) | 100 |
| Di-(2-ethylhexy) phthalate | 40 |
| Epoxidized soya bean oil | 10 |
| Asbestos | 50 |
| Calcium carbonate | 100 |
| Titanium dioxide | 5 |
| Stearic acid | 2 |
| Boric acid | 6 |
| Bisphenol A | 0.15 |

This composition was stable in an oven heated at 350° F. remaining undiscolored after 60 minutes exposure. Upon exposure to ultraviolet light in the Fade-o-meter, light stability up to 72 hours was achieved.

EXAMPLE 5

A formulation similar to Example 4 was compounded, except that 0.4 part of zinc stearate was added to the formulation. The sample was light stable for 144 hours in the Fade-o-meter. Because of the notable similarities between cadmium and zinc compounds as stabilizers in conventional stabilizer systems, tests were carried out on the comparative utility of cadmium and zinc stearate as light-stabilizing additives. In this series of tests the effect of boric acid concentration and of the presence of a phenolic antioxidant were similarly investigated.

Utilizing the first 7 ingredients of Example 4 in the amounts indicated therein, stabilizers in the amounts indicated in Table 1 below were also introduced into the formulation to yield compositions which when tested for light stability in the Fade-o-meter gave the following results:

*Table I*

VARIATION OF LIGHT-STABILITY WHICH COMPOSITION IN BORIC ACID STABILIZED VINYL-ASBESTOS COMPOSITIONS

| Stabilizer composition in parts per 100 of resin | | | | Light stability (hrs. to failure in Fade-o-meter) |
|---|---|---|---|---|
| Boric acid | Bisphenol A | Cadmium stearate | Zinc stearate | |
| 16.0 | 0.0 | 0.0 | 0.0 | 48 |
| 8.0 | 0.0 | 0.0 | 0.0 | 48 |
| 8.0 | 0.2 | 0.0 | 0.0 | 72 |
| 7.3 | 0.2 | 0.5 | 0.0 | 96 |
| 7.3 | 0.2 | 0.0 | 0.5 | 144 |
| 6.9 | 0.2 | 0.9 | 0.0 | 72 |
| 6.5 | 0.2 | 0.9 | 0.4 | 96 |
| 6.7 | 0.4 | 0.0 | 0.9 | 120 |

From Table I, it appears that the cadmium stearate contributes very little positive effect, while the zinc stearate contributes substantially. The antioxidant contributes slightly to the light stability.

We have found that the type of zinc salt added has slight effect as shown in the following Table II. The increased light stability of these examples over those shown in Table I is believed attributable to the lower impurity level of the batch of asbestos used in formulating the compositions for this series of tests. The formulation is in all other respects similar to that used for Table I.

Table II

EFFECT OF ORGANIC PORTION OF ZINC MOLECULE ON LIGHT STABILITY OF BORIC ACID-ZINC SALT STABILIZED VINYL-ASBESTOS FORMULATIONS WITH AND WITHOUT ANTIOXIDANT

| Zinc compound | Concentration in parts per 100 parts of resin | | | Light stability (hrs. to failure in Fade-o-meter) |
|---|---|---|---|---|
| | Boric acid | Zn comp.[1] | Bisphenol A | |
| None | 7.5 | 0.0 | 0.0 | 96 |
| Stearate | 7.5 | 0.5 | 0.0 | 306 |
| Do | 7.1 | 0.5 | 0.5 | 354 |
| Adipate | 7.4 | 0.08 | 0.5 | 354 |
| Salicylate | 7.3 | 0.24 | 0.5 | 354 |
| Sulfostearate | 7.2 | 0.4 | 0.5 | 306 |

[1] The zinc compound concentrations are calculated to give approximately equal zinc concentrations calculated as the metal.

EXAMPLE 6

Using the formulation of Example 1, and adding 3.8 parts of boric acid and 0.2 parts various zinc compounds, per 100 parts of resin, the following light-stability results were obtained:

Table III

EFFECT OF INORGANIC ZINC COMPOUNDS ON LIGHT-STABILITY OF A BORIC ACID-ZINC COMPOUND STABILIZED VINYL ASBESTOS FORMULATION

Zinc compound:

Light stability (hrs. to failure in Fade-o-meter)

| | |
|---|---|
| None | 72 |
| Oxide | 72 |
| Chloride | 96 |
| Stearate | 96 |

EXAMPLE 7

Again using the formulation of Example 1, various antioxidants were tested with 3.6–3.8 parts of boric acid per 100 parts of resin.

Table IV

Effect of phenolic antioxidants on the light stability of boric acid stabilized vinyl-asbestos system

| Boric acid (concn.) | Zinc stearate (concn.) | Phenolic constituent | | Light stability (hrs. to failure in Fade-o-meter) |
|---|---|---|---|---|
| | | Name | Concn. | |
| 3.8 | 0.0 | None | | 72 |
| 3.8 | 0.2 | do | | 96 |
| 3.8 | 0.0 | Bisphenol A | 0.2 | 108 |
| 3.6 | 0.2 | do | 0.2 | 120 |
| 3.8 | 0.0 | Di-tert-butyl p-cresol | 0.2 | 84 |
| 3.8 | 0.2 | do | 0.2 | 96 |
| 3.8 | 0.2 | Di-tert-butyl phenol | 0.2 | 96 |

The concentration of zinc, although added in the form of a zinc compound, is conveniently expressed as though it were the metal. Calculated as the metal, the amount of zinc employed in the light stabilization of the compositions of this invention is within the range of from about 0.01 to about 0.5 parts by weight of zinc per 100 parts of resin. On the basis of a zinc compound, the concentration is generally within the range of from about 0.1 to about 2 parts by weight per 100 parts of resin.

Other modes of applying the principle of this invention may be employed instead of those specifically set forth above, changes being made as regards the details herein disclosed, provided the elements set forth in any of the following claims or the equivalent of such be employed.

It is therefore, particularly pointed out and distinctly claimed as the invention:

1. An asbestos filled vinyl chloride containing resin containing at least 50% by weight vinyl chloride, having admixed therewith from 20 to 200 parts by weight of iron-containing asbestos, and containing in intimate admixture therewith from about 0.5 to about 20 parts by weight of boric acid which coacts therein to preserve stability of the asbestos filled vinyl chloride containing resin to heat.

2. An asbestos filled vinyl chloride containing resin in accordance with claim 1 in which the vinyl chloride containing resin is a co-polymer of vinyl chloride and vinyl acetate.

3. An asbestos filled vinyl chloride containing resin in accordance with claim 1 which is additionally characterized by the presence therein of from 0.01 to 0.5 parts by weight of zinc calculated as the metal per 100 parts of resin, and present as a zinc salt.

4. An asbestos filled poly vinyl chloride containing resin including the following ingredients in the amounts indicated:

20–200 parts iron-containing asbestos fiber
   100–200 parts calcium carbonate
   .5–20 parts boric acid
   .01–.5 parts zinc calculated as the metal
       said zinc being present as a zinc salt

References Cited in the file of this patent

UNITED STATES PATENTS

| | | |
|---|---|---|
| 2,617,783 | Slocombe | Nov. 11, 1952 |
| 2,881,151 | Young et al. | Apr. 7, 1959 |
| 2,897,176 | Rocky et al. | July 28, 1959 |

OTHER REFERENCES

"Principles of High-Polymer Theory and Practice," by Schmidt and Marlies (McGraw-Hill) (1948), page 313.